(12) United States Patent
Golovanov et al.

(10) Patent No.: US 9,363,286 B2
(45) Date of Patent: Jun. 7, 2016

(54) SYSTEM AND METHODS FOR DETECTION OF FRAUDULENT ONLINE TRANSACTIONS

(71) Applicant: Kaspersky Lab ZAO, Moscow (RU)

(72) Inventors: Sergey Y. Golovanov, Moscow (RU); Alexey V. Monastyrsky, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/264,501

(22) Filed: Apr. 29, 2014

(65) Prior Publication Data

US 2015/0269380 A1 Sep. 24, 2015

(30) Foreign Application Priority Data

Mar. 20, 2014 (RU) .................................. 2014110601

(51) Int. Cl.
*H04L 29/06* (2006.01)
*G06F 21/56* (2013.01)
*G06Q 20/40* (2012.01)

(52) U.S. Cl.
CPC .......... *H04L 63/1475* (2013.01); *G06F 21/562* (2013.01); *G06Q 20/4016* (2013.01); *H04L 63/1425* (2013.01)

(58) Field of Classification Search
CPC ..................... H04L 63/1475; H04L 63/1425
See application file for complete search history.

(56) References Cited

U.S. PATENT DOCUMENTS

| | | | |
|---|---|---|---|
| 7,080,000 B1 * | 7/2006 | Cambridge ..................... | 703/21 |
| 7,467,409 B2 * | 12/2008 | Reasor ..................... | G06F 21/50 726/22 |
| 7,509,679 B2 | 3/2009 | Alagan et al. | |
| 7,568,114 B1 | 7/2009 | Schlafly | |
| 7,631,357 B1 * | 12/2009 | Stringham ............ | G06F 21/568 726/24 |
| 7,694,150 B1 * | 4/2010 | Kirby ............................ | 713/188 |
| 7,921,461 B1 * | 4/2011 | Golchikov ............ | G06F 21/575 713/2 |
| 7,926,106 B1 * | 4/2011 | Kennedy ............... | G06F 21/568 713/1 |
| 8,065,712 B1 * | 11/2011 | Cheng et al. ..................... | 726/1 |

(Continued)

FOREIGN PATENT DOCUMENTS

RU 2402814 C2 10/2010
RU 2494448 C1 9/2013

OTHER PUBLICATIONS

Zhang, FuYong; Qi, DeYu; Hu, JingLin; "MBMAS: A System for Malware Behavior Monitor and Analysis", IEEE, International Symposium on Computer Network and Multimedia Technology, Jan. 18-20, 2009, pp. 1-4.*

(Continued)

*Primary Examiner* — Victor Lesniewski
(74) *Attorney, Agent, or Firm* — Arent Fox LLP; Michael Fainberg (57) ABSTRACT

Disclosed are some aspects of systems and methods for providing security for online transactions. An example method includes determining, at a security service, that an online transaction related to a payment service has been initiated at a computer by a user of the computer, collecting first information from the computer and second information from the payment service, and determining, based on the collected information, whether the online transaction is suspicious These aspects further include, when the online transaction is determined to be suspicious, determining whether a malicious program can be identified on the computer and when the malicious program is identified, performing corresponding remedial actions with respect to the detected malicious program.

17 Claims, 3 Drawing Sheets

(56) References Cited

U.S. PATENT DOCUMENTS

| | | | |
|---|---|---|---|
| 8,079,085 B1 | 12/2011 | Wu et al. | |
| 8,156,552 B2 | 4/2012 | Alagan et al. | |
| 8,225,401 B2* | 7/2012 | Sobel et al. | 726/23 |
| 8,280,833 B2 | 10/2012 | Miltonberger | |
| 8,495,741 B1* | 7/2013 | Naftel | G06F 21/575 |
| | | | 713/165 |
| 8,555,384 B1 | 10/2013 | Hanson et al. | |
| 8,627,479 B2* | 1/2014 | Wittenstein et al. | 726/25 |
| 8,700,913 B1* | 4/2014 | Chang et al. | 713/188 |
| 8,752,208 B2* | 6/2014 | Shulman et al. | 726/30 |
| 8,756,684 B2* | 6/2014 | Frantz et al. | 726/22 |
| 8,782,793 B2* | 7/2014 | Zaitsev | 726/24 |
| 9,087,188 B2* | 7/2015 | Sunder et al. | |
| 9,087,190 B2* | 7/2015 | Singh | |
| 9,178,900 B1* | 11/2015 | Li | H04L 63/1416 |
| 2004/0098607 A1 | 5/2004 | Alagna et al. | |
| 2005/0267954 A1* | 12/2005 | Lewis et al. | 709/221 |
| 2006/0259974 A1* | 11/2006 | Marinescu | G06F 21/56 |
| | | | 726/25 |
| 2008/0040785 A1* | 2/2008 | Shimada | G06F 21/33 |
| | | | 726/10 |
| 2008/0256635 A1* | 10/2008 | Gassoway | G06F 21/51 |
| | | | 726/24 |
| 2009/0271842 A1* | 10/2009 | Baumhof | 726/1 |
| 2010/0107228 A1 | 4/2010 | Lin | |
| 2010/0235908 A1 | 9/2010 | Eynon et al. | |
| 2011/0185421 A1* | 7/2011 | Wittenstein et al. | 726/22 |
| 2011/0289600 A1* | 11/2011 | Rusakov | 726/30 |
| 2012/0102568 A1* | 4/2012 | Tarbotton | G06F 21/552 |
| | | | 726/23 |
| 2012/0158541 A1 | 6/2012 | Ganti et al. | |
| 2012/0159633 A1* | 6/2012 | Grachev et al. | 726/24 |
| 2012/0180133 A1* | 7/2012 | Al-Harbi | H04L 63/1433 |
| | | | 726/25 |
| 2012/0297476 A1 | 11/2012 | Zeljkovic et al. | |
| 2012/0304296 A1* | 11/2012 | Shulman et al. | 726/23 |
| 2013/0007883 A1* | 1/2013 | Zaitsev | 726/24 |
| 2013/0061325 A1* | 3/2013 | Singh | H04L 63/145 |
| | | | 726/24 |
| 2013/0073844 A1* | 3/2013 | Shimada | H04L 63/08 |
| | | | 713/156 |
| 2013/0097708 A1* | 4/2013 | Jayanthi et al. | 726/25 |
| 2013/0160100 A1* | 6/2013 | Langley | 726/7 |
| 2013/0179954 A1* | 7/2013 | Bidare | 726/7 |
| 2013/0340080 A1* | 12/2013 | Gostev | H04L 63/145 |
| | | | 726/24 |
| 2014/0041025 A1* | 2/2014 | Ur | 726/22 |
| 2014/0122343 A1* | 5/2014 | Einav et al. | 705/67 |
| 2014/0189872 A1* | 7/2014 | Wu et al. | 726/24 |
| 2014/0331317 A1* | 11/2014 | Singh | 726/22 |

OTHER PUBLICATIONS

Takemori, Keisuke; Nishigaki, Masakatsu; Takami, Tomohiro; Miyake, Yutaka; "Detection of Bot Infected PCs Using Destination-based IP and Domain Whitelists during a Non-operating Term", IEEE Global Telecommunications Conference, Nov. 30-Dec. 4, 2008, 6 pgs.*

Garcia-Cervigon, Manuel; Medina Llinas, Manel; "Browser Function Calls Modeling for Banking Malware Detection", 7th International Conference on Risks and Security of Internet and Systems, Oct. 10-12, 2012, 7 pgs.*

* cited by examiner

SYSTEM AND METHODS FOR DETECTION OF FRAUDULENT ONLINE TRANSACTIONS

CROSS-REFERENCE TO RELATED APPLICATIONS

This application claims benefit of priority under 35 U.S.C. 119(a)-(d) to a Russian Application No. 2014110601 filed on Mar. 20, 2014, which is incorporated by reference herein.

TECHNICAL FIELD

The present disclosure pertains to computer security, and more specifically, to systems and methods for detection of fraudulent online transactions.

BACKGROUND

There is a large amount of software at present that can be used to perform various online transactions. Many transactions are performed via online banking, using standard browsers, and individual banking clients are also used, being especially popular on mobile platforms. When using a browser to perform a transaction, the user generally goes to the bank site and performs an authentication (which is sometimes a two-factor type, for example, with the aid of SMS or a token), after which he/she is able to perform operations with his/her own funds.

With the growth of online payments, hackers have become interested in this service segment, and they are actively looking for ways to intercept transaction data for the unlawful transfer of funds. The theft of transaction data generally takes place by using malicious programs which get onto the computers of users (infecting the computers). Such programs most often get onto infected computers through popular Internet browsers and intercept data being entered from input devices (such as a keyboard or mouse), or they intercept data being sent to the network. For example, malicious programs infecting browsers gain access to the browser files and look at the history of visits and the passwords saved when visiting web pages. Data entry interceptors (or keyloggers) intercept the entry of data from a keyboard or mouse, take pictures of screens (or screenshots) and conceal their presence in the system by means of various rootkit technologies. Such technologies are also used by interceptors of network packets (or traffic sniffers), which intercept network packets being transmitted, extracting valuable information from them, such as passwords and other personal data. Most often, the infection occurs by utilizing vulnerabilities in software which make it possible to use various exploits to penetrate the computer system.

The existing antivirus technologies such as the use of signature or heuristic checks, methods of proactive protection or the use of lists of trusted applications (or whitelists), although able to detect many malicious programs on the computers of users, are not always able to determine their new modifications, which are appearing more frequently day by day. Thus, solutions are needed which can secure the procedure of performing online payments by users.

However, no methods have been described at present that could detect unknown malicious programs that affect transactions (such as those carrying out a Man-in-the-Browser attack). Even if it would be possible on the bank side to reject a transaction from a client because it includes suspicious circumstances, on the client side the malicious program can still continue working for a long time, until an antivirus program is installed, the antivirus databases are updated, or the user performs a reinstallation of the operating system or a rollback.

SUMMARY

Disclosed are different aspect of systems, methods and computer program products for providing security for user transactions by detection of malicious programs that are used for fraudulent transactions.

According to one aspect, an example method may include determining, by a security service, that an online transaction related to a payment service has been initiated at a computer by a user of the computer. The method may further include collecting first information from the computer and second information from the payment service, and determining, based on the collected information, whether the online transaction is suspicious. When the online transaction is determined to be suspicious, the method may determine whether a malicious program can be identified on the computer. When the malicious program is identified, the method may perform one or more remedial actions with respect to the detected malicious program.

In another aspect, the online transaction may be determined to be initiated when one or more of the following events occur: the user starts a browser on the computer, the user goes on a website associated with the online transaction, the user enters a user login and password at the website, and the user directly requests provision of security for the online transaction.

In another aspect, the first information may include one or more of an antivirus database version of the computer, events related to detection of malicious programs at the computer in a period of time, antivirus components being used at the computer, data input modules and entry patterns used by the user of the computer, a detection log of an anti-phishing module at the computer, an identifier of the computer, processes started at the computer, file operations at the computer, registry operations at the computer, a list of network connections of the computer, a list of devices connected to the computer, vulnerabilities at the computer, and installed updates for the operating system or applications of the computer.

In another aspect, the second information may include one or more of information on the online transaction, information on the browser of the computer, an identifier of the computer, structure information of a webpage seen by the user of the computer, and data input modules and entry patterns used by the user of the computer.

In another aspect, the online transaction may be determined to be suspicious further based on third information obtained from network provider and fourth information obtained from the security service.

In another aspect, the fourth information includes one or more of transaction information related to the online transaction, a history of transactions related to an account of the user of the computer, and possible risks associated with the online transaction.

In another aspect, the third information includes a network traffic route from the computer to the payment service.

In another aspect, determining whether the malicious program can be identified on the computer includes: determining whether the antivirus of the computer can identify the malicious program on the computer; and when the antivirus of the computer cannot identify the malicious program, further determining whether the malicious program can be identified on the computer by performing one or more of: downloading a latest version of an antivirus database for the antivirus program; checking a file system, a registry, processes started, network connections opened on the computer with more thorough check settings, changing rules for application control to allow only trusted applications or applications with no known vulnerabilities to be started, rebooting the computer with additional checks for rootkits and bootkits, and accessing a security service or analysts of the payment service.

In another aspect, the remedial actions may include one or more of: performing a rollback of an operating system of the computer to a preceding state from a backup copy; removing the malicious program and performing a rollback of the changes made by it; canceling the online transaction; warning the user of the computer as to a possible substitution of the online transaction by a fraudulent transaction; and notifying the payment service as to transactions from the user of the computer or from the computer as being possibly suspicious.

According to another aspect, an example system for providing security for online transactions includes a processor that may be configured to determine that an online transaction related to a payment service has been initiated at a computer by a user of the computer; collect first information from the computer and second information from the payment service; determine, based on the first information and the second information, whether the online transaction is suspicious; when the online transaction is determined to be suspicious, determine whether a malicious program can be identified on the computer; and when the malicious program is identified, perform one or more remedial actions with respect to the detected malicious program.

According to yet another aspect, a computer program product stored on a non-transitory computer-readable storage medium comprises computer-executable instructions for providing security for online transactions, including instructions for determining, by a security service, that an online transaction related to a payment service has been initiated at a computer by a user of the computer; collecting first information from the computer and second information from the payment service; determining, based on the first information and the second information, whether the online transaction is suspicious; when the online transaction is determined to be suspicious, determining whether a malicious program can be identified on the computer; and when the malicious program is identified, performing one or more remedial actions with respect to the detected malicious program.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for providing security for online transactions. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
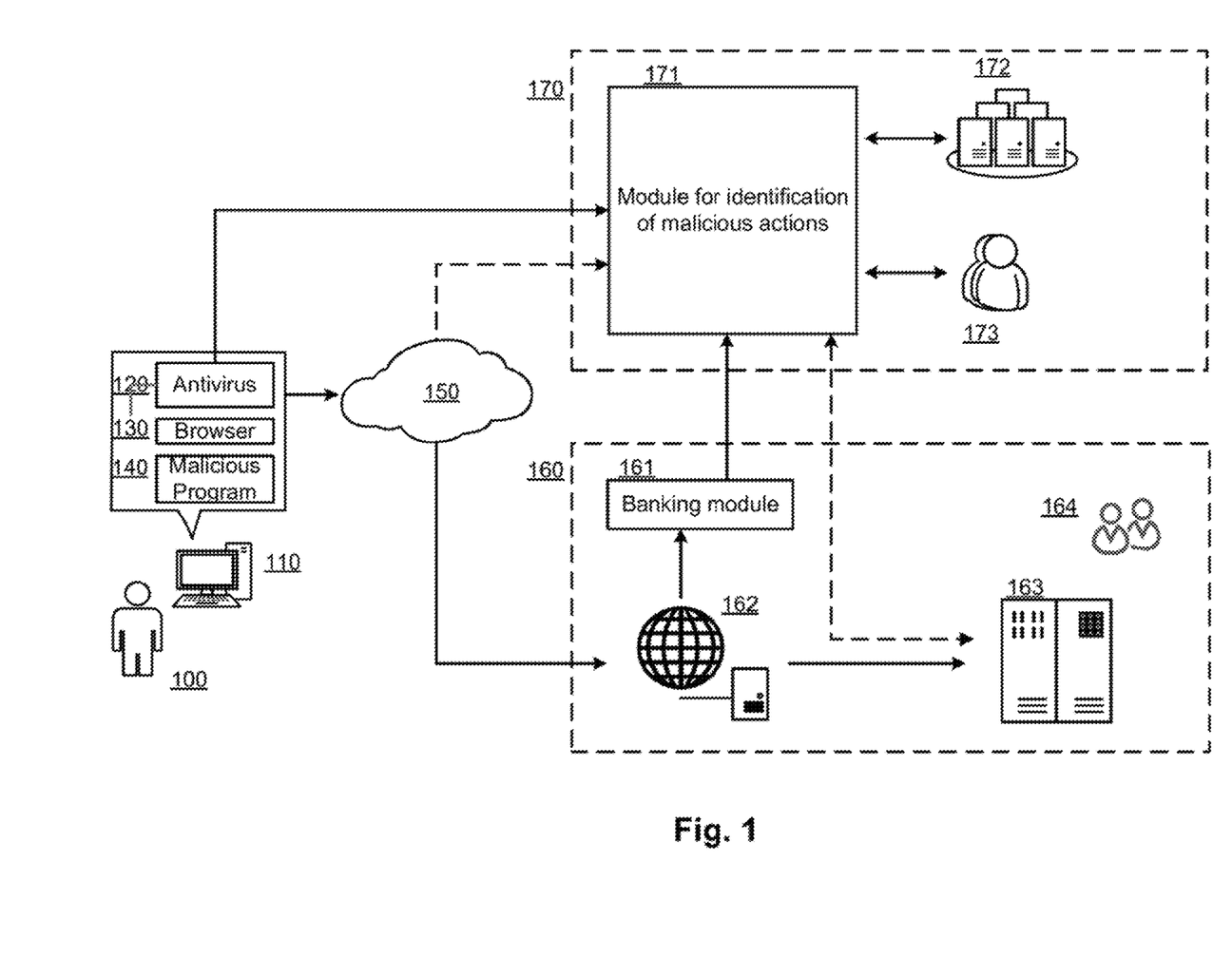
FIG. 1 illustrates an example system for providing security for online transactions according to one aspect.

FIG. 1 in an example system for providing security for online transactions according to some present aspects. The user 100 is working at a computer 110, employing a browser 130 to perform online transactions via a payment service 160. In some aspects, the user employs the browser 130 to go to the website 162 of the payment service 160. Browser 130 may be, for example, web browsers such as Internet Explorer or Google Chrome, but may also include other applications configured to perform online transactions, such as banking clients.

In some aspects, if an antivirus 120 is installed on the computer 110, one may not be assured that the computer is free of malicious programs 140, which may get onto the computer for various reasons, for example, because the antivirus database of antivirus 120 was not timely updated, the antivirus 120 was installed after the malicious program 140 got onto the computer, the user 100 set a low level of protection in the settings of the antivirus 120, or the malicious program was not yet known or analyzed by the antivirus company. Thus, there may be a risk that the user may be deceived by various methods used to carry out fraudulent transactions. For example, phishing makes it possible to mimic with great veracity the website 162 of the payment service 160, while the use of a man-in-the-browser (MITM) attack makes it possible to counterfeit the digital certificate of the website, which may deceive the user, but also result in skipping a possible antivirus checking of the website.

In order to avoid the possible compromising of the user and the performing of a fraudulent transaction, the payment service 160 may include its own security analysts 164 and mechanisms for checking the validity of transactions (validity checking mechanisms 163), which are engaged in checking the component parts of a transaction (e.g., information on the payer, details of the transaction such as time, frequency, amount) to identify suspicious transactions which may turn out to be fraudulent. However, not having complete information about the computer system 110, the security analysts 164 and transaction validity checking mechanisms 163 may not be able to fully evaluate the possible risk for each subsequent transaction and may make a mistake, since the creators of malicious programs 140 may be improving their techniques to get past not only the scrutiny of the user 100 and the antivirus technologies, but also the checking algorithms on the side of the banks and payment services.

In some aspects, however, the system also includes a security service 170, which includes a module for identification of malicious actions 171, as well as antivirus analysts 173 and a malicious program database 172. The antivirus analysts 173 play an auxiliary role, correcting the work of the module for identification of malicious actions 171, which plays the main role in the identification of malicious activity on the computer 110, and blocking fraudulent transactions, using feedback with the transaction validity checking mechanism 163 on the payment service 160 side. The malicious program database 172 may include algorithms for detection of malicious programs such as, for example, those specified in U.S. Pat. No. 7,640,589, U.S. Pat. No. 7,743,419, U.S. Pat. No. 8,356,354, U.S. Pat. No. 8,572,740. The malicious program database 172 may also include rules for detection of malicious applications, which are used by the module for identification of malicious actions 171 on the basis of data from the antivirus 120 and the banking module 161, which is installed on the side of the payment service 160 and provides information to the side of the security service 170. Optionally, in some aspects, in the module for identification of malicious actions 171, information is obtained from the network providers 150 and the transaction validity checking mechanism 163. The network providers 150 may be, for example, local Internet providers whose services are being used by the users 100, or major providers which control the main communications networks which link together autonomous systems (AS).

In some aspects, identification of malicious actions are performed based on events on the side of the computer 110 of the user 100 and information obtained from the banking module 161.

An example of the information on the side of the computer 110 may include:
 the antivirus database version;
 events connected with the detection of malicious programs in a given period of time, such as a day or a month;
 the antivirus 120 status in the form of the components being used, such as the firewall, the file antivirus, the web antivirus;
 the use of data input modules by the user 100, entry patterns in the form of, for example, the frequency of typing keys or moving the mouse;
 the detection log of the antiphishing module;
 the identifier of the computer 110;
 the processes started;
 file operations;
 registry operations;
 the list of network connections;
 the list of connected devices, such as a token;
 vulnerabilities at the computer 110 side;
 installed updates for the operating system or such applications as the browser 130.

In some aspects, the information on the side of the computer 110 may be more detailed than the example list provided herein. For example, if the antivirus 120 includes a firewall, then the module for identification of malicious actions 171 may also be sent information not only about the type of connections and processes which open them, but also more detailed information, such as information from the HTTP headers in the form of cookie data, the type of data being transmitted, the type of agent (the browser 130) and so on.

An example of the information on the side of the banking module 161 may include:
 information on the transaction (account, time of the transaction, amount of funds, and so on);
 information on the browser 130;
 the identifier of the computer 110 (which may be calculated from a number of indirect parameters, such as the IP address);
 the structure of the web page which is seen by the user 100 (e.g., DOM model);
 the use of data input modules by the user 100, entry patterns in the form of, for example, the frequency of key strokes or mouse movements.

In some alternative or additional aspects, the module for identification of malicious actions 171 may also obtain information from the network providers 150 and the transaction validity checking mechanism 163. An example of this information from the transaction validity checking mechanism 163 may include:
 more detailed information on the transaction;
 the history of transactions relating to the accounts of the user 100;
 possible risks associated with a specific transaction or user 100.

In some alternative or additional aspects, the network providers 150 may also indicate the traffic route from the user 100 to the website 162. Furthermore, in order to determine possible anomalies, techniques may be used to determine the traffic route, such as those in US patent publication number US 20130086636.

Figure 2:
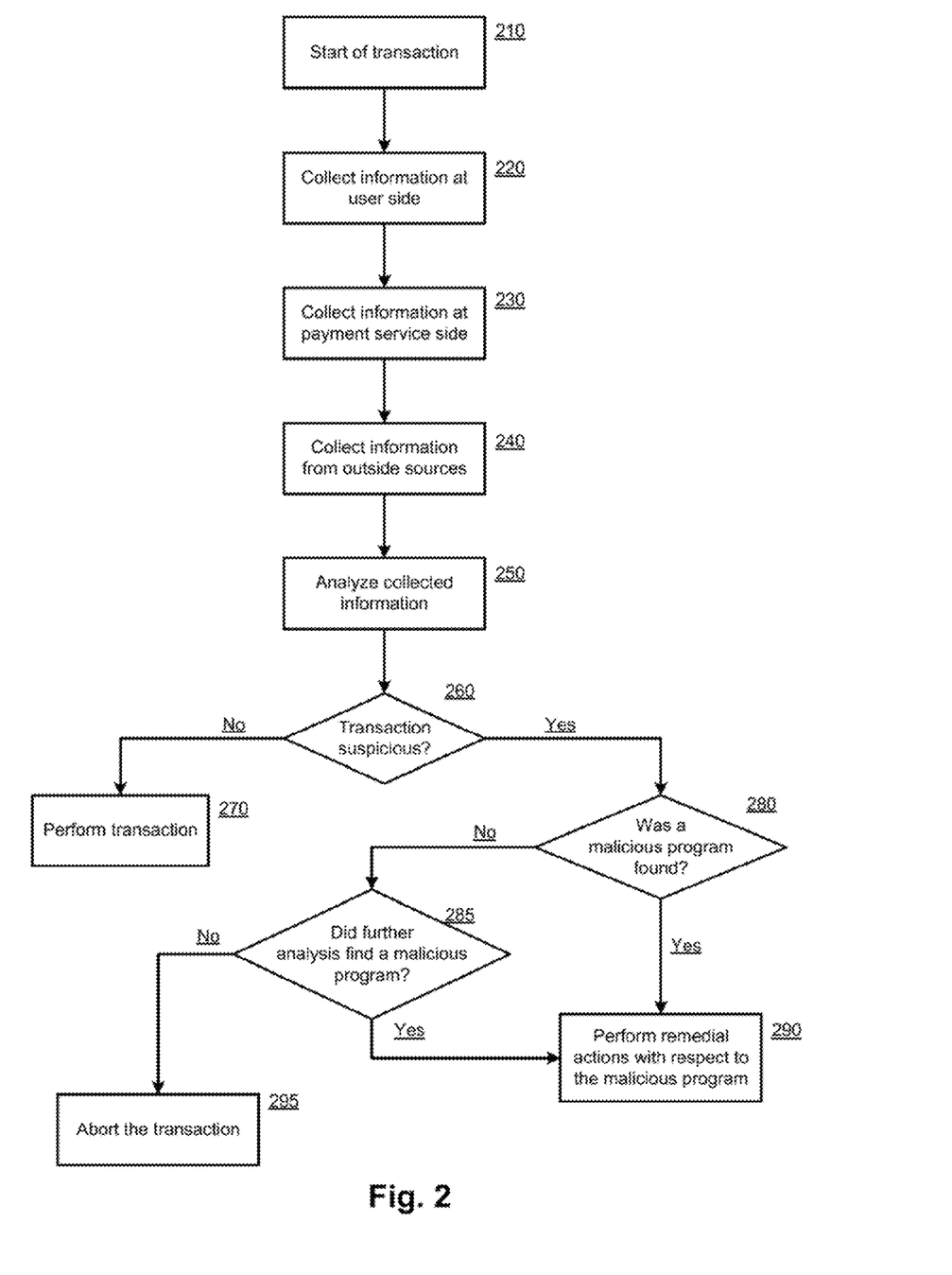
FIG. 2 is a flowchart of an example method according to some present aspects.

FIG. 2 is a flowchart of an example method according to some aspects. In step 210 the user 100 initiates a transaction, which may be determined based on various criteria such as:
 the user 100 has started the browser;
 the user 100 has entered the website 162;
 the user 100 enters his/her login and password on the website 162, that is, is authenticated on the website 162 for possible carrying out of an online transaction;
 the user independently selects the system of protection of the online transaction with the aid of the system according to example aspects (e.g., the user directly requests provision of security for the online transaction).

After step 210, in steps 220, 230, 240 information is collected from the side of the computer 110 (with the aid of the antivirus 120 in step 220), the banking module 161 (step 230), and also the network providers 150 and the transaction validity checking mechanism 163 (step 240). In step 250 an analysis is made on the information collected. Next, in step 260, it is determined whether or not the transaction is suspicious. If the transaction is not suspicious, the transaction is completed without any restrictions in step 270. If the transaction is classified as suspicious, then in step 280 it is determined whether it was possible to identify on the side of the computer 100 a malicious program 140 with the aid of the antivirus 120. In this case, if a malicious program 140 could not be identified at once, then in step 285 a further analysis is performed, after which in step 290 the consequences of the working of the malicious program are cleared away. But if the further analysis was not able to identify a malicious program, then in step 295 the transaction is aborted and the user is informed about the suspicious activity on his/her computer.

The further analysis in step 285 may include, for example, one or more of the following:
 downloading the latest version of the antivirus databases;
 checking the file system (e.g., on demand scan), the registry, and the processes downloaded with more "thorough" check settings;
 changing the rules for application control, allowing only trusted applications or applications with no known vulnerabilities to be started;
 rebooting the computer with additional check for rootkits and bootkits;
 accessing the security service of the payment service 160 or the side of the security service 170 (for example, accessing the analysts 173).

Clearing away of the consequences of the working of a malicious program 290 may include one or more of the following:

- rollback of the operating system to one of the preceding states (e.g., from a backup copy);
- removal of the malicious program found, and also rollback of the changes made by it;
- cancellation of the current transaction;
- warning of the user 100 as to the possible substitution of the current transaction by a fraudulent one;
- notification of the payment service 160 as to transactions from the particular user 100 being possibly suspicious (or those from the computer 110).

The following are examples of the method of FIG. 2.

EXAMPLE NO. 1

After the start of the transaction, events relating to entry from a keyboard and mouse are registered in the browser window, but no data has arrived from physical devices. The banking module 161 is also able to send information about the successful authentication (e.g., the entry of data from the computer 110 was successful), but the antivirus 120 sends a notification as to the possible use of a remote administration service. As a countermeasure, the current transaction is prevented, and an analysis is initiated on the computer of the processes initiated (including trusted ones) and the connections used. In addition, an anti-rootkit check may be performed after rebooting the computer to discover any hidden drivers in the operating system.

EXAMPLE NO. 2

The banking module 161 is able to send information on successful authentication (e.g., the data input from the computer 110 was successful), but the antivirus 120 sends information that the certificate of the website 162 is different from the previous one and is not reliable. Thus, there is a Man-in-the-Browser attack, after which an antivirus check is started on the computer 110, and the current transaction is rejected at the side of the payment service 160.

EXAMPLE NO. 3

The module for identification of malicious actions 171 determines from the identifier of the computer that a transaction is being done from a computer 110 that has been previously noted as being a computer from which suspicious transactions are performed. This information may be obtained from a history of fraudulent transactions on the side of the transaction validity checking mechanisms 163. In such a case, a request is sent to the side of the antivirus 120 of the given computer 110 as to the status of the antivirus protection (e.g., the date of last check, the number of malicious programs found, the status of the antivirus databases). If it was determined that the last check did not find any malicious programs, then the current transaction is allowed, otherwise it is rejected and the antivirus 120 performs additional checks.

In some aspects, the additional antivirus checks may be done with more thorough settings than were assigned by the user 100. The user 100 may be sent a notification as to possible fraud involving his/her computer 110, and the need to check the computer 110 for the presence of malicious programs.

EXAMPLE NO. 4

It is determined that the patterns of data entry by the user do not match. Such discrepancies may be discovered either by comparing the patterns of entry with the aid of the antivirus 120 on the computer 110 and the banking module 161, or on the basis of the history of known patterns of entry on the part of the user 100. In this case, the transaction is flagged as suspicious and a further antivirus check is ordered.

EXAMPLE NO. 5

The user 100 goes to the website of a payment service, however the address of the website is not confirmed as a trusted one on the part of the module for identification of malicious actions 171. On the part of the banking module 161 it is also discovered that the website 162 may be compromised (for example, an XSS attack). After this, the transaction is aborted, and a notification as to the vulnerability discovered is sent to the payment service.

EXAMPLE NO. 6

It is determined that the antivirus 120 is compromised. For example, the module for identification of malicious actions 171 receives information from the antivirus 120 that the protective functions are turned on at present during the performance of a transaction. However, information arrives from the banking module 161 that the transaction may be fraudulent: the entry pattern on the part of the user does not match, or there is different information about the browser 130 previously used for transactions on the part of the computer 110. A notification is sent to the antivirus 120 to reboot the computer and perform an antivirus check for the presence of rootkits and bootkits, and also to carry out an update of antivirus databases.

Figure 3:
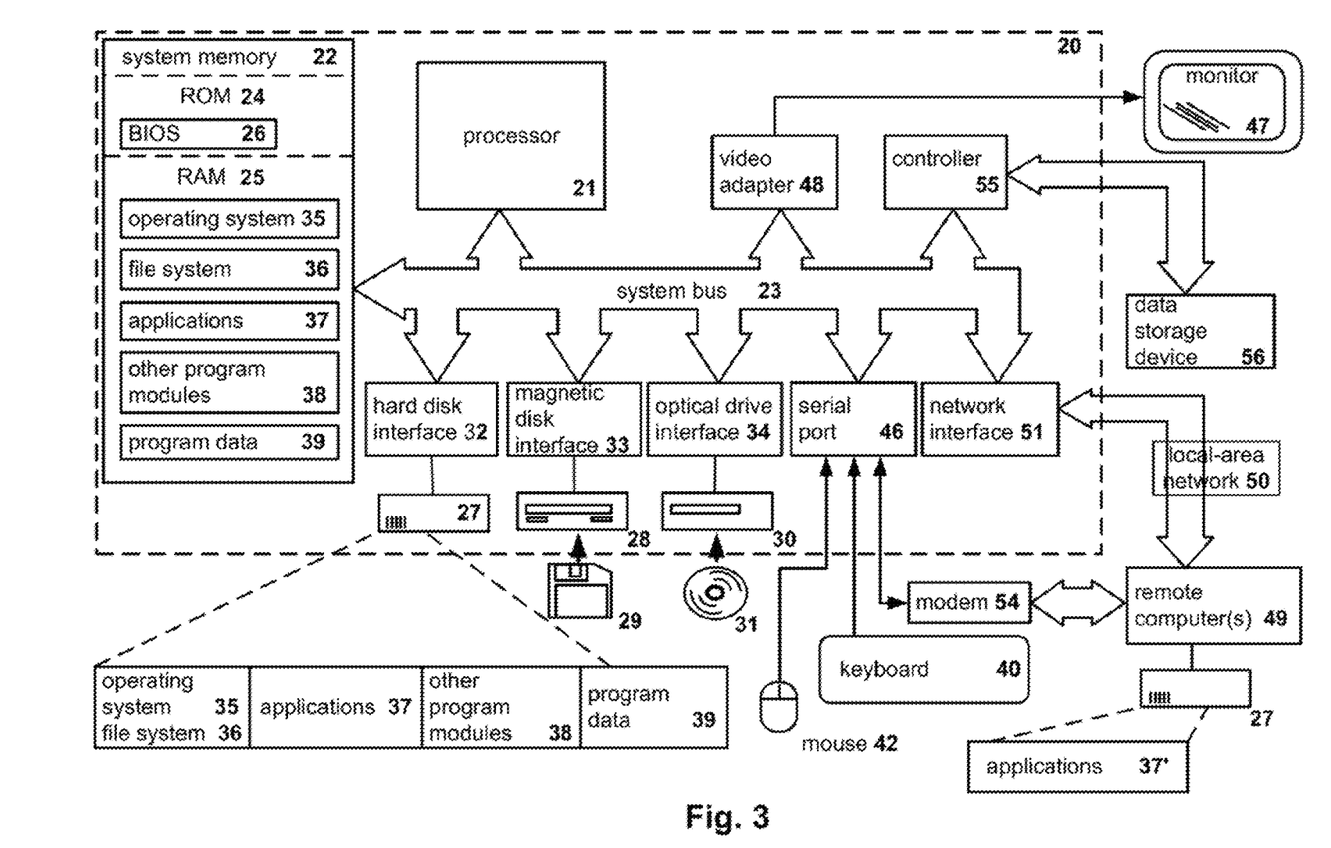
FIG. 3 shows an example of a general-purpose computer system on which the present invention can be implemented.

FIG. 3 shows an example of a general-purpose computer system (which may be a personal computer or a server) 20, including a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 6 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for providing security for online transactions, comprising:
   determining, by a computer processor, that an online transaction related to a payment service has been initiated by a user computer;
   collecting, by the computer processor, first information from the user computer and second information from the payment service, where the first information includes: (1) capabilities of an antivirus program installed on the user computer based on at least a current version of the antivirus program, and (2) a status of the antivirus program indicating at least a date of a last scan of the user computer by the antivirus program and an identification of prior malicious programs found by the last scan;
   determining, by the computer processor, based on both the first information from the user computer and the second information from the payment service, whether the online transaction is suspicious and processing the online transaction when the online transaction is not determined to be suspicious, including a determination that no prior malicious programs were found by the last scan of the user computer;
   when the computer processor determines that the online transaction is suspicious, analyzing, by the computer processor, the capabilities and the status of the antivirus program to determine whether the antivirus program is currently configured to detect one or more malicious programs on the user computer;

when the computer processor determines that the antivirus program is currently configured to detect the one or more malicious programs and the one or more malicious programs is detected by the antivirus program, performing, by the computer processor, one or more remedial actions with respect to the detected one or more malicious programs, including cancelling the online transaction;

when the computer processor determines that the antivirus program is not currently configured to detect the one or more malicious programs, performing additional actions to detect the one or more malicious programs on the user computer, the additional actions including downloading a latest version of the antivirus program to perform an updated scan of the user computer and rebooting the user computer with checks for rootkits and bootkits;

if the one or more malicious programs is detected in response to the additional actions, performing, by the computer processor, one or more remedial actions of the detected one or more malicious programs; and cancelling the online transaction if the additional actions do not identify the one or more malicious programs.

2. The method of claim 1, wherein the online transaction is determined to be initiated when one or more of the following events occur:
the user starts a browser on the user computer,
the user goes on a website associated with the online transaction,
the user enters a user login and password at the website, and
the user directly requests provision of security for the online transaction.

3. The method of claim 1, wherein the first information includes one or more of:
an antivirus database version of the user computer,
events related to detection of malicious programs at the computer in a period of time,
antivirus components being used at the user computer,
data input modules and entry patterns used by the user of the user computer,
a detection log of an anti-phishing module at the user computer,
an identifier of the user computer,
processes started at the user computer,
file operations at the user computer,
registry operations at the user computer,
a list of network connections of the user computer,
a list of devices connected to the user computer,
vulnerabilities at the user computer, and
installed updates for the operating system or applications of the user computer.

4. The method of claim 1, wherein the second information includes one or more of:
information on the online transaction,
information on the browser of the user computer,
an identifier of the user computer,
structure information of a webpage seen by the user of the user computer, and
data input modules and entry patterns used by the user of the user computer.

5. The method of claim 1, wherein the online transaction is determined to be suspicious further based on third information obtained from a network provider and fourth information obtained from a security service.

6. The method of claim 5, wherein the fourth information includes one or more of:
transaction information related to the online transaction,
a history of transactions related to an account of the user of the user computer, and
possible risks associated with the online transaction.

7. The method of claim 5, wherein the third information includes a network traffic route from the user computer to the payment service.

8. The method of claim 1, wherein the one or more remedial actions include one or more of:
performing a rollback of an operating system of the user computer to a preceding state from a backup copy;
removing the one or more malicious programs and performing a rollback of the changes made by the one or more malicious programs;
warning the user of the user computer as to a possible substitution of the online transaction by a fraudulent transaction; and
notifying the payment service as to transactions from the user of the user computer or from the user computer as being possibly suspicious.

9. A system for providing security for online transactions, comprising:
a computer processor configured to:
determine that an online transaction related to a payment service has been initiated by a user computer;
collect first information from the user computer and second information from the payment service, where the first information includes: (1) capabilities of an antivirus program installed on the user computer based on at least a current version of the antivirus program, and (2) a status of the antivirus program indicating at least a date of a last scan of the user computer by the antivirus program and an identification of prior malicious programs found by the last scan;
determine, based on both the first information from the user computer and the second information from the payment service, whether the online transaction is suspicious and process the online transaction when the online transaction is not determined to be suspicious, including a determination that no prior malicious programs were found by the last scan of the user computer;
when the computer processor determines that the online transaction is suspicious, analyze the capabilities and the status of the antivirus program to determine whether the antivirus program is currently configured to detect one or more malicious programs on the user computer;
when the computer processor determines that the antivirus program is currently configured to detect the one or more malicious programs and the one or more malicious programs is detected by the antivirus program, perform one or more remedial actions with respect to the detected one or more malicious programs, including cancelling the online transaction;
when the computer processor determines that the antivirus program is not currently configured to detect the one or more malicious programs, perform additional actions to detect the one or more malicious programs on the user computer, the additional actions including downloading a latest version of the antivirus program to perform an updated scan of the user computer and rebooting the user computer with checks for rootkits and bootkits;

if the one or more malicious programs is detected in response to the additional actions, perform one or more remedial actions of the detected one or more malicious programs; and
cancel the online transaction if the additional actions do not identify the one or more malicious programs.

10. The system of claim 9, wherein the online transaction is determined to be initiated when one or more of the following events occur:
the user starts a browser on the user computer,
the user goes on a website associated with the online transaction,
the user enters a user login and password at the website, and
the user directly requests provision of security for the online transaction.

11. The system of claim 9, wherein the first information includes one or more of:
an antivirus database version of the user computer,
events related to detection of malicious programs at the user computer in a period of time,
antivirus components being used at the user computer,
entry modules and entry patterns used by the user of the user computer,
a detection log of an anti-phishing module at the user computer,
an identifier of the user computer,
processes started at the user computer,
file operations at the user computer,
registry operations at the user computer,
a list of network connections of the user computer
a list of devices connected to the user computer,
vulnerabilities at the user computer, and
installed updates for the operating system or applications of the user computer.

12. The system of claim 9, wherein the second information includes one or more of:
information on the online transaction,
information on the browser of the user computer,
an identifier of the user computer,
structure information of a webpage seen by the user of the user computer, and
data input modules and entry patterns used by the user of the user computer.

13. The method of claim 9, wherein the online transaction is determined to be suspicious further based on third information obtained from a network provider and fourth information obtained from a security service.

14. The system of claim 13, wherein the fourth information includes one or more of:
transaction information related to the online transaction,
a history of transactions related to an account of the user of the user computer, and
possible risks associated with the online transaction.

15. The system of claim 13, wherein the third information includes a network traffic route from the user computer to the payment service.

16. The system of claim 9, wherein the one or more remedial actions further include one or more of:
performing a rollback of an operating system of the user computer to a preceding state from a backup copy;
removing the one or more malicious programs and performing a rollback of changes made by the one or more malicious programs;
warning the user of the user computer as to a possible substitution of the online transaction by a fraudulent transaction; and
notifying the payment service as to transactions from the user of the user computer or from the computer as being possibly suspicious.

17. A computer program product stored on a non-transitory computer-readable storage medium, the computer program product comprising computer-executable instructions for providing security for online transactions, including instructions for:
determining, by a computer processor that implements the instructions, that an online transaction related to a payment service has been initiated by a user computer;
collecting, by the computer processor, first information from the user computer and second information from the payment service, where the first information includes: (1) capabilities of an antivirus program installed on the user computer based on at least a current version of the antivirus program, and (2) a status of the antivirus program indicating at least a date of a last scan of the user computer by the antivirus program and an identification of prior malicious programs found by the last scan;
determining, by the computer processor, based on both the first information from the user computer and the second information from the payment service, whether the online transaction is suspicious and processing the online transaction when the online transaction is not determined to be suspicious, including a determination that no prior malicious programs were found by the last scan of the user computer;
when the computer processor determines that the online transaction is suspicious, analyzing, by the computer processor, the capabilities and the status of the antivirus program to determine whether the antivirus program is currently configured to detect one or more malicious programs on the user computer;
when the computer processor determines that the antivirus program is currently configured to detect the one or more malicious programs and the one or more malicious programs is detected by the antivirus program, performing, by the computer processor, one or more remedial actions with respect to the detected one or more malicious programs, including cancelling the online transaction;
when the computer processor determines that the antivirus program is not currently configured to detect the one or more malicious programs, performing additional actions to detect the one or more malicious programs on the user computer, the additional actions including downloading a latest version of the antivirus program to perform an updated scan of the user computer and rebooting the user computer with checks for rootkits and bootkits;
if the one or more malicious programs is detected in response to the additional actions, performing, by the computer processor, one or more remedial actions of the detected one or more malicious programs; and
cancelling the online transaction if the additional actions do not identify the one or more malicious programs.

* * * * *